(12) United States Patent
Childs et al.

(10) Patent No.: US 10,319,457 B2
(45) Date of Patent: Jun. 11, 2019

(54) METHODS AND SYSTEMS OF TESTING INTERFACES OF COMPUTER STORAGE FOR STORAGE VULNERABILITIES

(71) Applicant: International Business Machines Corporation, Armonk, NY (US)

(72) Inventors: Bryan C. Childs, Poughkeepisie, NY (US); Karl D. Schmitz, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 254 days.

(21) Appl. No.: 15/075,336

(22) Filed: Mar. 21, 2016

(65) Prior Publication Data

US 2017/0271027 A1   Sep. 21, 2017

(51) Int. Cl.
| | |
|---|---|
| *G11C 29/38* | (2006.01) |
| *G11C 29/36* | (2006.01) |
| *G11C 29/44* | (2006.01) |
| G11C 29/50 | (2006.01) |

(52) U.S. Cl.
CPC ............. *G11C 29/38* (2013.01); *G11C 29/36* (2013.01); *G11C 29/44* (2013.01)

(58) Field of Classification Search
CPC ......... G11C 29/38; G11C 29/36; G11C 29/44; G11C 2029/5602
See application file for complete search history.

(56) References Cited

U.S. PATENT DOCUMENTS

| | | | | |
|---|---|---|---|---|
| 6,223,312 | B1 * | 4/2001 | Nozuyama | G06F 11/27 714/724 |
| 6,865,514 | B1 * | 3/2005 | Goguen | G06F 11/3419 702/117 |
| 7,299,382 | B2 | 11/2007 | Jorapur | |
| 2003/0084256 | A1 * | 5/2003 | McKee | G06F 12/1475 711/152 |
| 2004/0172300 | A1 * | 9/2004 | Mihai | A61B 5/0002 705/2 |

(Continued)

*Primary Examiner* — April Y Blair
*Assistant Examiner* — Dipakkumar B Gandhi
(74) *Attorney, Agent, or Firm* — Cantor Colburn LLP; William Kinnaman

(57) ABSTRACT

Embodiments include methods, and computer system, and computer program products for testing directly and indirectly anchored interfaces for vulnerabilities regarding storage protection keys. Aspects include: defining a test template for each parameter area interface for a given system service's interface for vulnerabilities regarding storage protection keys by replacing each parameter area interface with unauthorized parameters to generate expected failures, defining a test template for each parameter area interface having variable-length fields for vulnerabilities regarding buffer overflows in an attempt to access a protected storage area beyond an unprotected storage area with a larger length field to generate expected failures, defining a test template for each control block to replicate copies that will generate expected failures from the system service's validation, executing at least one test for each test template generated, summarizing results of the tests executed, and returning an overall return code based on summarized results.

20 Claims, 3 Drawing Sheets

(56) References Cited

U.S. PATENT DOCUMENTS

| | | | |
|---|---|---|---|
| 2005/0216611 A1* | 9/2005 | Martinez | G06F 12/1408 |
| | | | 710/22 |
| 2006/0179386 A1 | 8/2006 | Pushpavanam et al. | |
| 2008/0104576 A1* | 5/2008 | Kaksonen | G06F 11/3672 |
| | | | 717/124 |
| 2012/0304009 A1* | 11/2012 | Oshima | G01R 31/31937 |
| | | | 714/33 |
| 2013/0212682 A1* | 8/2013 | McClure | G06F 21/577 |
| | | | 726/25 |
| 2016/0154586 A1* | 6/2016 | Craske | G06F 3/0604 |
| | | | 711/202 |
| 2016/0380769 A1* | 12/2016 | Bar | H04L 9/30 |
| | | | 713/193 |

* cited by examiner

METHODS AND SYSTEMS OF TESTING INTERFACES OF COMPUTER STORAGE FOR STORAGE VULNERABILITIES

BACKGROUND

The present disclosure relates generally to mainframe computing, and more particularly to methods, systems and computer program products of testing interfaces for storage vulnerabilities including storage protection keys and buffer overflows.

Storage protection keys in various forms are utilized on many computing platforms to provide an added security mechanism. Storage protection keys have the following elements: (a) each virtual memory page is assigned a small integer key value, (b) an indication whether that key applies to fetch protection or merely protects write access, and (c) a corresponding execution key for the unit of work. Generally the execution key must match the corresponding memory. There may be a specially designated execution key value that can access any storage key, and similarly there may be a specially designated virtual memory key that can be accessed by any execution key.

An exemplary vulnerability of computer storage protected by storage protection keys may include an unauthorized user passing bad addresses to a system service. The system service could be running with an authorized key, and if it trusts the user supplied address, could indirectly provide that user read or even write access to storage to which that user should not have access. Another vulnerability of computer storage may include buffer overflows. When parameter areas include variable-length fields, transfers of data can overflow when the boundaries of those length fields are not checked. A third exemplary vulnerability of computer storage may include system-owned control blocks. When an unauthorized user passes an address to a system-owned control block, the system service must verify that block through an independently anchored chain. Otherwise an unauthorized user could spoof the control block in order to cause that system service to take various actions that it would otherwise not take.

In order to ensure system integrity, system services should be tested in their use of untrusted parameters, including parameters that are directly anchored and those that are indirectly anchored by virtual addresses within a base parameter list. Additionally system services should be tested when variable-length fields are used to prevent buffer overflows. Addresses to control block need to be independently verified from system-controlled anchors.

Therefore, heretofore unaddressed needs still exist in the art to address the aforementioned deficiencies and inadequacies.

SUMMARY

In an embodiment of the present invention, a method of testing interfaces of a computer storage of a computer system for storage vulnerabilities may include: defining a test template for each parameter area interface for a given system service's interface for vulnerabilities regarding storage protection keys by replacing each parameter area interface with unauthorized parameters to generate expected failures, defining a test template for each parameter area interface having variable-length fields for vulnerabilities regarding buffer overflows in an attempt to access a protected storage area beyond an unprotected storage area with a larger length field to generate expected failures, defining a test template for each control block to replicate copies that will generate expected failures from the system service's validation, executing at least one test for each test template generated, summarizing results of the tests executed, and returning an overall return code based on summarized results of the tests executed.

In another embodiment of the present invention, a computer system for testing interfaces of a computer storage of the computer system for storage vulnerabilities may include a memory having computer executable instructions, and a processor for executing the computer executable instructions. The computer executable instructions may include: defining a test template for each parameter area interface for a given system service's interface for vulnerabilities regarding storage protection keys by replacing each parameter area interface with unauthorized parameters to generate expected failures, defining a test template for each parameter area interface having variable-length fields for vulnerabilities regarding buffer overflows in an attempt to access a protected storage area beyond an unprotected storage area with a larger length field to generate expected failures, defining a test template for each control block to replicate copies that will generate expected failures from the system service's validation, executing at least one test for each test template generated, summarizing results of the tests executed, and returning an overall return code based on summarized results of the tests executed.

In yet another embodiment of the present invention, a computer readable storage medium may store computer executable instructions for testing interfaces of a computer storage of a computer system for storage vulnerabilities. When executed by a processor of the computer system, the computer executable instructions cause the processor to perform: defining a test template for each parameter area interface for a given system service's interface for vulnerabilities regarding storage protection keys by replacing each parameter area interface with unauthorized parameters to generate expected failures, defining a test template for each parameter area interface having variable-length fields for vulnerabilities regarding buffer overflows in an attempt to access a protected storage area beyond an unprotected storage area with a larger length field to generate expected failures, defining a test template for each control block to replicate copies that will generate expected failures from the system service's validation, executing at least one test for each test template generated, summarizing results of the tests executed, and returning an overall return code based on summarized results of the tests executed.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
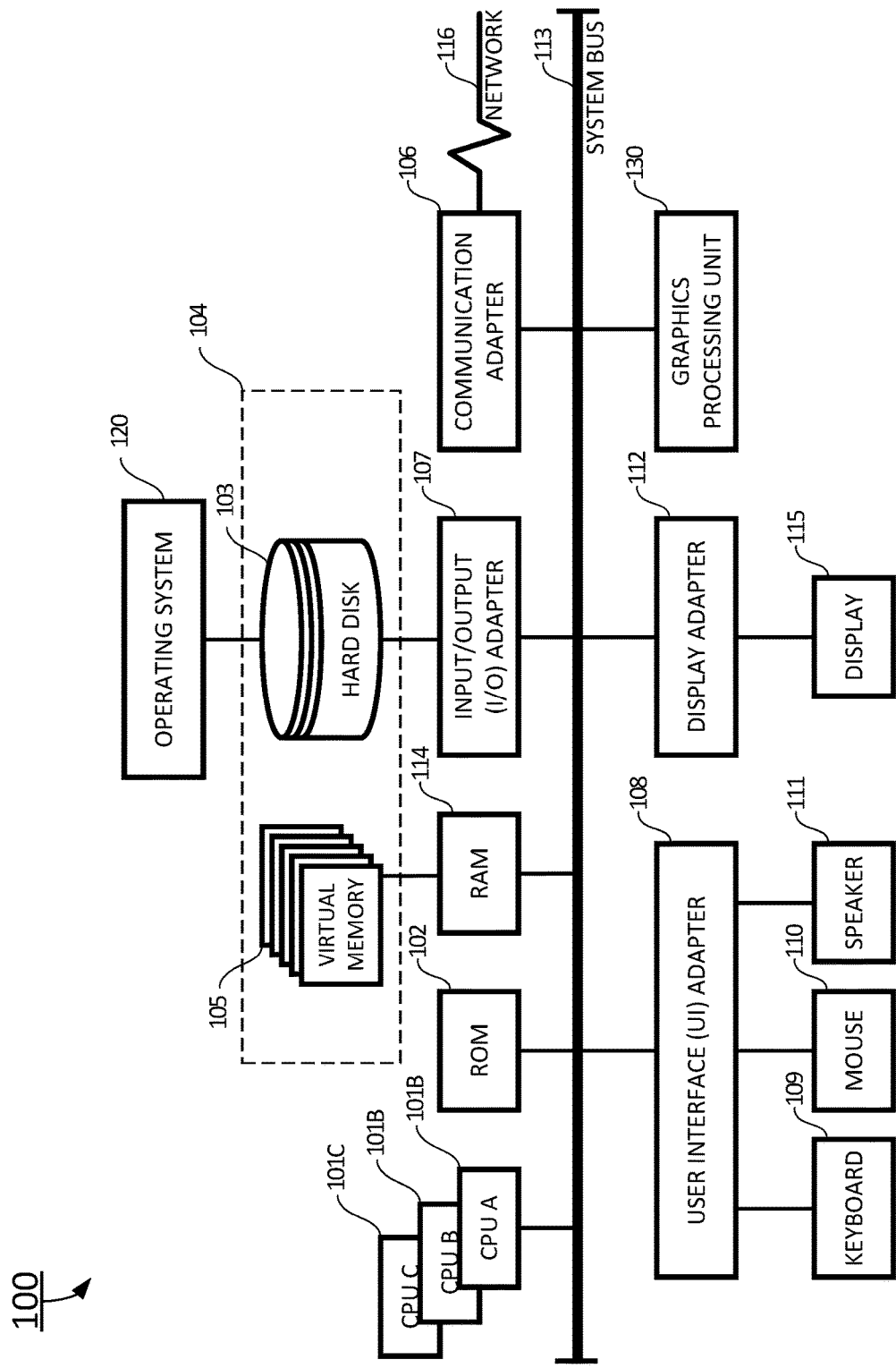
FIG. 1 is a block diagram illustrating an exemplary computer system for testing various parameter area interfaces of a computer storage for storage vulnerabilities according to certain embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "plurality" means two or more. The terms "comprising," "including," "carrying," "having," "containing," "involving," and the like are to be understood to be open-ended, i.e., to mean including but not limited to.

The term computer program, as used above, may include software, firmware, and/or microcode, and may refer to programs, routines, functions, classes, and/or objects. The term shared, as used above, means that some or all code from multiple modules may be executed using a single (shared) processor.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings FIGS. 1-3, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, an embodiment of a computer system 100 of testing interfaces of computer storage for vulnerabilities regarding storage protection keys and implementing the teachings is shown. In this embodiment, the computer system 100 has one or more central processing units (processors) 101A, 101B, 101C, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or virtual storage 105 or any other similar component. Virtual storage 105 is generally understood within computer and information technology industry to combine physical RAM with auxiliary storages. Collectively this virtual storage can make the computer system appear to have more RAM than it actually does, providing greater scalability characteristics, and also adding security-relevant properties such as storage protection keys. I/O adapter 107, hard disk 103, and tape storage device 105 are collectively referred to herein as mass storage 104.

Operating system 120 for execution on the computer system 100 may be stored in mass storage 104. A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

In certain embodiments, the hard disk 103 may be used to store data. In other embodiments, the data may be stored in virtual memory 105. Data may be stored in a mass storage facility near a mainframe computer system, and may be accessed through the network 116 as shown in FIG. 1.

In certain embodiments, the storage protect keys may include at least a predetermined number of lower level storage protection keys, and a predetermined number of higher level storage protection keys. In certain embodiments, for example, in an IBM mainframe computer, there are 16 storage protect keys: 0-15. The higher level storage protection keys include 0-7 (an authorized key), and the lower level storage protection keys include 8-15 (an unauthorized key). A system service running in key 0 for example can access any virtual storage regardless of the storage key, whereas a service requester running in key 8 can only update key 8 storage and read other storage that is not fetch protected.

When a user requests a service from a service provider, he makes a functional call, and in certain embodiments, parameters both direct and indirect, to clarify that service request. If the requester points to storage for which his execution key should not give him access, the service provider must be sure to reject the request. Further, the service provider must access those parameters in the execution key of the caller, and not the authorized key that is typical to the service provider's execution.

Figure 2:
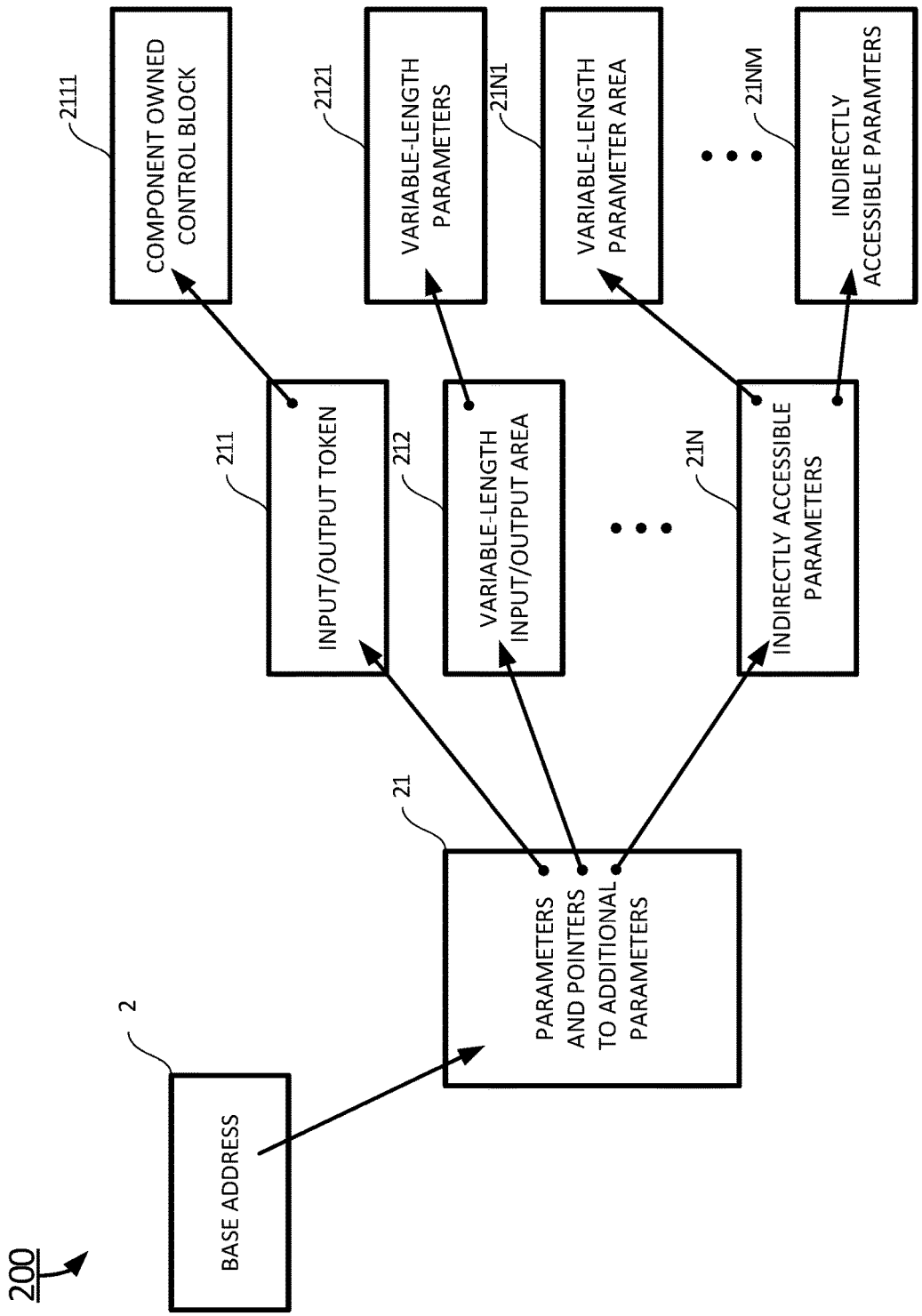
FIG. 2 is an exemplary storage structure having various parameter area interfaces according to certain exemplary embodiments of the present invention.
Figure 3:
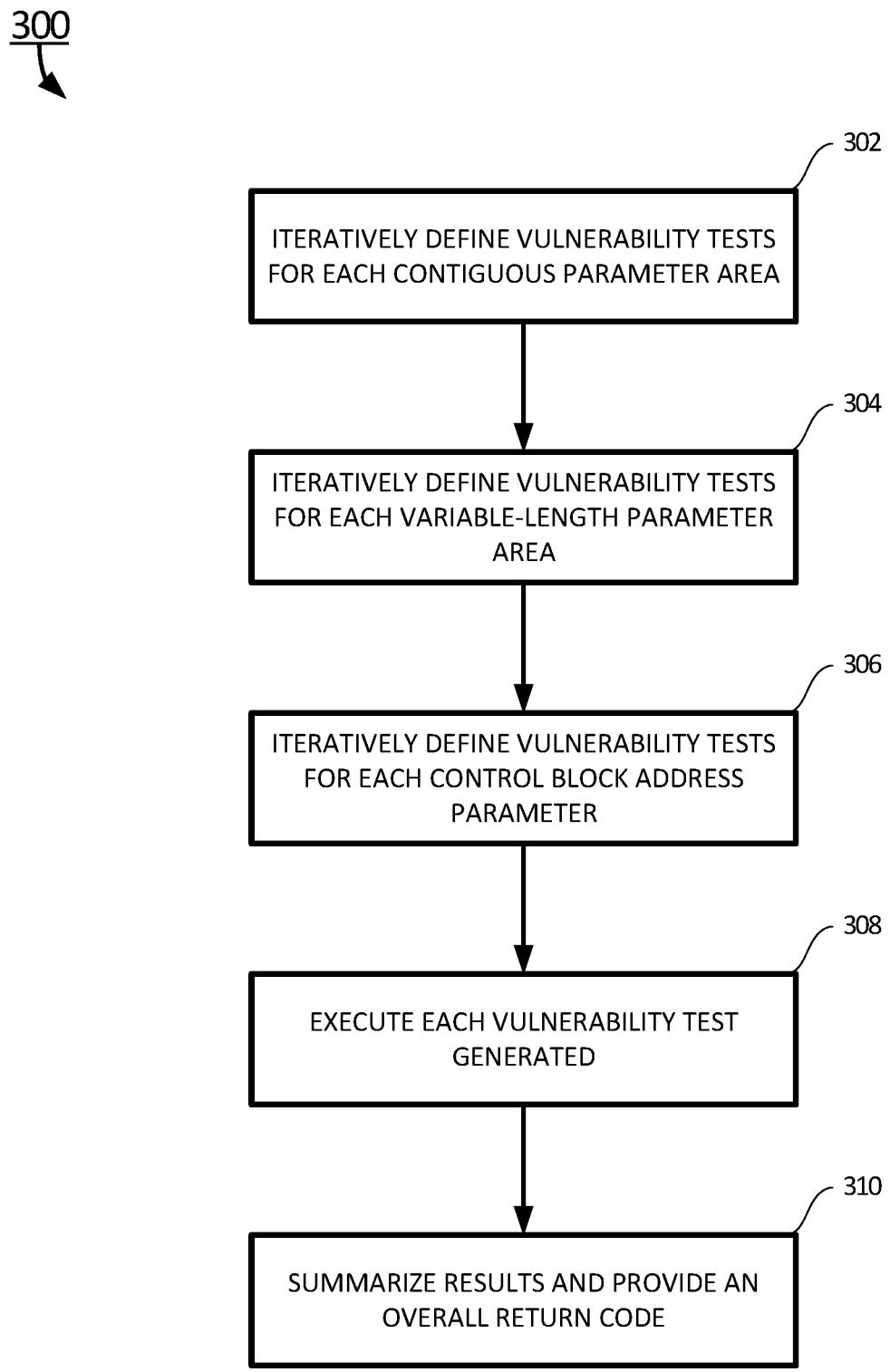
FIG. 3 is a flow chart of an exemplary method of testing parameter area interfaces for vulnerabilities regarding storage protection keys according to certain embodiments of the present invention.

Referring now to FIG. 2, an exemplary storage structure 200 having various directly and indirectly anchored interfaces is shown according to certain exemplary embodiments of the present invention. Usually, the computer storage of the computer system is accessed through a base address 2 pointing to a base interface 21. The base interface 21 may contain various variables, parameters, and pointer to other parameters. For example, the base interface 21 may have one or more Input/Output token interfaces 211, one or more variable-length Input/Output area interfaces 212, and one or more indirect parameter area interfaces 21N. Additional, each of the one or more Input/Output token interfaces 211 may further point to one or more component owned control block interfaces 2111. Each of the one or more variable-length Input/Output areas interfaces 212 may point to one or more variable-length parameter area interfaces 2121. Each of the one or more indirect parameter area interfaces 21N may point to M different data areas such as from variable-length parameter area interfaces interface 21N1 through other indirect parameter area interfaces 21NM. Any of these interfaces may become vulnerable and may be attacked through various unauthorized services requests. Therefore, in order to ensure safety of the computer storage, each and every one of the interfaces must be discovered and tested. Additionally, for the interfaces having variable-length data field, a length beyond user accessible area must be tested, and verified, and all unauthorized service request must be rejected.

In certain embodiments, the storage protection keys may include multiple lower level storage protection keys, and multiple higher level storage protection keys. A service provider running on the computer system is authorized to access a protected storage area corresponding to the higher level storage protection keys as well as an unprotected storage area corresponding to the lower level storage protection keys. A user requesting service is only authorized to access an unprotected storage area corresponding to the lower level storage protection keys.

In one embodiment, the present invention relates to a method of testing interfaces of a computer storage of a computer system for storage vulnerabilities. Referring now to FIG. 3, a flow chart of an exemplary method 300 embodied by a vulnerability test tool running on the computer system 100 for testing interfaces of the computer storage of the computer system 100 for storage vulnerabilities is shown according to certain embodiments of the present invention.

In certain embodiments, the various parameter area interfaces have a base parameter area interface, anchored by a base address, one or more indirect parameter area interfaces anchored off the base parameter area interface, and one or more additional parameter area interfaces anchored off the one or more indirect parameter area interfaces. The vulnerability test tool utilizes a single completed set of parameters to execute the service, along with the addresses of the various pieces. The vulnerability test tool need not know what kind of system resource a particular service manages. It uses the programmatically formatted template to iteratively inject the various types of errors in order to subsequently test for vulnerabilities.

At block 302, the vulnerability test tool first programmatically defines a test template for each parameter area interface for a given system service's interface for vulnerabilities regarding storage protection keys by replacing each parameter area interface with unauthorized parameters to generate expected failures. The vulnerability test tool may replace each of the parameter areas with authorized storage and invoke the system service. Since the system service request contains a parameter area that the user should not be able to access, the system service should reject the request.

In certain embodiments, the vulnerability test tool may create test templates with unauthorized access to protected storage areas through the base parameter area interface, test templates with unauthorized access to protected storage areas through each of the indirect parameter area interfaces, test templates with unauthorized access to protected storage areas through each of the additional parameter area interfaces, and test templates with unauthorized access to protected storage areas through one or more component-owned control blocks.

In one embodiment, the vulnerability test tool may create a service request with unauthorized access to a protected storage area to a service provider through the base interface 21. In another embodiment, the computer system 100 may create a service request with unauthorized access to a protected storage area to the service provider through one or more indirect parameter area interfaces such as 211, 212, . . . and 21N. In yet another embodiment, the computer system 100 may create a service request with unauthorized access to a protected storage area to the service provider through one or more component-owned control block interfaces 2111.

When a service request with a test template having unauthorized access to the protected storage area is not properly rejected, a test associated with the test template is considered a failure.

At block 304, the vulnerability test tool first may programmatically define a test template for each parameter area interface having variable-length fields for vulnerabilities regarding buffer overflows in an attempt to access a protected storage area beyond an unprotected storage area with a larger length field to generate expected failures. Since the service is expected to reject out-of-bounds length values, the request should be rejected. Otherwise, a buffer overflow can occur that can cause various adverse effects upon the service provider's program.

In certain embodiments, the vulnerability test tool may create test templates for parameter area interfaces having one or more variable-length fields through the base parameter area interface, test templates for parameter area interfaces having one or more variable-length fields through each of the indirect parameter area interfaces, test templates for parameter area interfaces having one or more variable-length fields through each of the additional parameter area interfaces, and defining test templates for parameter area interfaces having one or more variable-length fields through one or more component-owned control blocks.

In certain embodiments, for a service request having a variable-length field, the vulnerability test tool may defining a service request in an attempt to access a protected storage area beyond an unprotected storage area with a larger length field to a service provider through the base interface. In one embodiment, the vulnerability test tool may create a service request in an attempt to access a protected storage area beyond the unprotected storage area with a larger length field to a service provider through an indirect parameter area interface. In another embodiment, the vulnerability test tool may create a service request in an attempt to access a protected storage area beyond the unprotected storage area with a larger length field to a service provider through a component-owned control block.

At block 306, the vulnerability test tool may proceed to programmatically define a test template for each control block to replicate copies and verify the replicated copies through an independently anchored chain that will generate expected failures from the system service's validation.

At block 308, the vulnerability test tool may execute each one of the test templates generated above to test the vulnerabilities of interfaces of the computer storage of the computer system.

In certain embodiments, the vulnerability test tool may process the test templates of system service and its parameter area interfaces, making copies of those parameter areas before iterative replacing each with authorized-key, fetch-protected storage and subsequently with large variable length values. The vulnerability test tool then executes all test templates and present each service request created to the service provider to test each and every one of the parameter area interfaces, and each and every variable-length parameter and through these parameter area interfaces. The tests executed may include tests for parameter area interface for vulnerabilities regarding storage protection keys, tests for parameter area interface having variable-length fields for vulnerabilities regarding buffer overflows, and tests for address to each control block to independently verify from system-controlled anchors.

For example, an exemplary test for system vulnerability through a base interface is shown in FIG. 2 according to certain embodiments of the present invention. In this test, one or more parameters and variables may be replaced in an attempt to access protected storage areas. A parameter having storage protection key 8, is replaced an address pointing to a parameter having storage protection key 0 to access data at the address where the parameter having storage protection key 0 is located. On the other hand, if the base interface 21 has a variable-length parameter located in the variable-length Input/Output area interface 212, the service request to access unprotected storage area may include a length definition that is larger than the parameter defined. The service provider should detect the mismatch of the length field of the variable-length parameter and properly deny the service request.

In certain embodiments, once the base interface 21 is fully tested, the focus of test may move to the interfaces that base interface 21 may point to. For example, the method 300 may replace the parameters passed into the Input/Output Token interface 211, and test the Input/Output Token interface 211. Then the variable-length Input/Output Area interface 212, through the indirect parameter area interfaces 21N, and the component owned control block interface 2111, the variable-length parameters and variable interface 2121, and variable-length indirect parameter area interface 21N1 through indirect parameter area interface 21NM. The method 300 continues to test until each and every one of the interfaces discovered is fully tested.

In order to ensure storage protection and data security, each and every one of the interfaces must be thoroughly tested, every separately anchored parameter area interface should be tested for a storage key related vulnerability, and every variable-length area must be tested for buffer overflow with a significantly large length value and every passed control block address should be tested for independent chain verification.

When a service request having variable-length fields with a test template having larger length fields is not properly rejected, or when a buffer overflow is not properly reported, a test associated with the test template is considered a failure.

At block 310, once the test templates are executed, the vulnerability test tool may summarize test results and send an overall return code to indicate whether the tests are successful. The overall return code may include an overall success return code when (1) every test template generated is tested, and every service request having unauthorized access to a protected storage area is properly rejected, (2) every test template having variable-length fields generated is tested, a service request having variable-length fields with a test template having larger length fields is properly rejected, and every buffer overflow is properly reported, and (3) every test template having a passed control block address is tested, a service request with a test template having a passed control block address that is properly verified through independent chain verification. The overall return code may include an overall failure return code when (1) every test template generated is tested, and at least one service request having unauthorized access to a protected storage area is not properly rejected, (2) every test template having variable-length fields generated is tested, and at least one service request having variable-length fields with a test template having larger length fields is not properly rejected, and at least one buffer overflow is not properly reported, and (3) every test template having a passed control block address is tested, and at least one service request with a test template having a passed control block address that is not properly verified through independent chain verification.

In another embodiment of the present invention, a computer system for testing interfaces of a computer storage of the computer system for storage system vulnerabilities may include a memory having computer executable instructions, and a processor for executing the computer executable instructions. The computer executable instructions may include: defining a test template for each parameter area interface for a given system service's interface for vulnerabilities regarding storage protection keys by replacing each parameter area interface with unauthorized parameters to generate expected failures, defining a test template for each parameter area interface having variable-length fields for vulnerabilities regarding buffer overflows in an attempt to access a protected storage area beyond an unprotected storage area with a larger length field to generate expected failures, defining a test template for each control block to replicate copies that will generate expected failures from the system service's validation, executing at least one test for each test template generated, summarizing results of the tests executed, and returning an overall return code based on summarized results of the tests executed.

In yet another embodiment of the present invention, a computer readable storage medium may store computer executable instructions for testing interfaces of a computer storage of a computer system for storage system vulnerabilities. When executed by a processor of the computer system, the computer executable instructions cause the processor to perform: defining a test template for each parameter area interface for a given system service's interface for vulnerabilities regarding storage protection keys by replacing each parameter area interface with unauthorized parameters to generate expected failures, defining a test template for each parameter area interface having variable-length fields for vulnerabilities regarding buffer overflows in an attempt to access a protected storage area beyond an unprotected storage area with a larger length field to generate expected failures, defining a test template for each control block to replicate copies that will generate expected failures from the system service's validation, executing at least one test for each test template generated, summarizing results of the tests executed, and returning an overall return code based on summarized results of the tests executed.

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of testing interfaces of a computer storage of a computer system for storage system vulnerabilities, comprising:
    generating, by the computer system comprising one or more processors, a plurality of first test templates, wherein generating the plurality of first test templates includes generating a first test template for each contiguous parameter area of a plurality of parameter area interfaces for a given system service's interface for vulnerabilities regarding storage protection keys by replacing, by the system, each contiguous parameter area of the plurality of parameter area interfaces with unauthorized parameters to generate expected failures;
    generating, by the computer system, a plurality of second test templates, wherein the generating of the plurality of second test templates includes generating a second test template for each variable-length parameter area of the plurality of parameter area interfaces having variable-length fields for vulnerabilities regarding buffer overflows in an attempt to access a protected storage area beyond an unprotected storage area with a larger length field to generate expected failures;
    generating, by the computer system, a plurality of third test templates, wherein the generating of the plurality of third test templates includes generating a third test template for each control block of a plurality of control blocks to replicate copies and verify the replicated copies through an independently anchored chain that will generate expected failures from the system service's validation;
    processing, by the computer system, the plurality of first test templates, the plurality of second test templates, the plurality of third test templates, and the plurality of parameter area interfaces, wherein the processing includes making, by the computer system, copies of the plurality of parameter area interfaces before iteratively replacing each with authorized-key, fetch-protected storage and subsequently replacing each with large variable length values;
    after making the copies, executing, by the computer system, one or more tests for each first template of the plurality of first templates, each second template of the plurality of second templates, and each third template of the third plurality of templates; and
    summarizing, by the computer system, results of the tests executed and returning an overall return code based on summarized results of the tests.

2. The method of claim 1, wherein the storage protection keys comprise at least a plurality of lower level storage protection keys and a plurality of higher level storage protection keys, wherein a service provider running on the computer system is authorized to access a protected storage area corresponding to the plurality of higher level storage protection keys as well as an unprotected storage area corresponding to the plurality of lower level storage protection keys, and a user requesting service is only authorized to access an unprotected storage area corresponding to the plurality of lower level storage protection keys.

3. The method of claim 1, wherein the generating of the first test template comprises at least one of:
    defining a test template with unauthorized access to a protected storage area through a base address; and
    defining a test template with unauthorized access to a protected storage area through an indirect interface.

4. The method of claim 1, wherein the generating of the second test template comprises at least one of:
    defining a test template for a parameter area interface having one or more variable-length fields through a base address; and
    defining a test template for a parameter area interface having one or more variable-length fields through an indirect parameter area interface.

5. The method of claim 1, wherein the generating of the third test template comprises at least one of:
    defining a test template with unauthorized access to a protected storage area through a component-owned control block; and
    defining a test template for a parameter area interface having one or more variable-length fields through a component-owned control block.

6. The method of claim 1, wherein a failed test comprises at least one of:
    a service request with a test template having unauthorized access to a protected storage area is not rejected;

a service request having variable-length fields with a test template having larger length fields is not rejected;
a buffer overflow is not reported; and
a service request having a passed control block address that is not verified through independent chain verification.

7. The method of claim 1, wherein the returning of the overall return code comprises:
returning an overall success return code when at least the following combination occurs:
every test template generated is tested, and every service request having unauthorized access to a protected storage area is rejected;
every test template having variable-length fields generated is tested, a service request having variable-length fields with a test template having larger length fields is rejected, and every buffer overflow is reported; and
every test template having a passed control block address is tested, a service request with a test template having a passed control block address that is verified through independent chain verification; and
returning an overall failure return code when at least the following combination occurs:
every test template generated is tested, and at least one service request having unauthorized access to a protected storage area is not rejected;
every test template having variable-length fields generated is tested, and at least one service request having variable-length fields with a test template having larger length fields is not rejected, and at least one buffer overflow is not reported; and
every test template having a passed control block address is tested, and at least one service request with a test template having a passed control block address that is not verified through independent chain verification.

8. A computer system for testing interfaces of a computer storage of the computer system for storage system vulnerabilities comprising a memory having computer executable instructions; and a processor for executing the computer executable instructions, the computer executable instructions including:
generating, by the computer system, a plurality of first test templates, wherein generating the plurality of first test templates includes generating a first test template for each contiguous parameter area of a plurality of parameter area interfaces for a given system service's interface for vulnerabilities regarding storage protection keys by replacing, by the system, each contiguous parameter area of the plurality of parameter area interfaces with unauthorized parameters to generate expected failures;
generating, by the computer system, a plurality of second test templates, wherein the generating of the plurality of second test templates includes generating a second test template for each variable-length parameter area of the plurality of parameter area interfaces having variable-length fields for vulnerabilities regarding buffer overflows in an attempt to access a protected storage area beyond an unprotected storage area with a larger length field to generate expected failures;
generating, by the computer system, a plurality of third test templates, wherein the generating of the plurality of third test templates includes generating a third test template for each control block of a plurality of control blocks to replicate copies and verify the replicated copies through an independently anchored chain that will generate expected failures from the system service's validation;
processing, by the computer system, the plurality of first test templates, the plurality of second test templates, the plurality of third test templates, and the plurality of parameter area interfaces, wherein the processing includes making, by the computer system copies of the plurality of parameter area interfaces before iteratively replacing each with authorized-key, fetch-protected storage and subsequently replacing each with large variable length values;
after making the copies, executing, by the computer system, one or more tests for each first template of the plurality of first templates, each second template of the plurality of second templates, and each third template of the third plurality of templates; and
summarizing, by the computer system, results of the tests executed and returning an overall return code based on summarized results of the tests.

9. The computer system of claim 8, wherein the storage protection keys comprise at least a plurality of lower level storage protection keys and a plurality of higher level storage protection keys, wherein a service provider running on the computer system is authorized to access a protected storage area corresponding to the plurality of higher level storage protection keys as well as an unprotected storage area corresponding to the plurality of lower level storage protection keys, and a user requesting service is only authorized to access an unprotected storage area corresponding to the plurality of lower level storage protection keys.

10. The computer system of claim 8, wherein the generating of the first test template comprises at least one of:
defining a test template with unauthorized access to a protected storage area through a base address; and
defining a test template with unauthorized access to a protected storage area through an indirect interface.

11. The computer system of claim 8, wherein the generating of the second test template comprises at least one of:
defining a test template for a parameter area interface having one or more variable-length fields through a base address; and
defining a test template for a parameter area interface having one or more variable-length fields through an indirect parameter area interface.

12. The computer system of claim 8, wherein the generating of the third test template comprises at least one of:
defining a test template with unauthorized access to a protected storage area through a component-owned control block; and
defining a test template for a parameter area interface having one or more variable-length fields through a component-owned control block.

13. The computer system of claim 12, wherein a failed test comprises at least one of:
a service request with a test template having unauthorized access to a protected storage area is not rejected;
a service request having variable-length fields with a test template having larger length fields is not rejected;
a buffer overflow is not reported; and
a service request having a passed control block address that is not verified through independent chain verification.

14. The computer system of claim 8, wherein the returning of the overall return code comprises:
returning an overall success return code when at least the following combination occurs:

every test template generated is tested, and every service request having unauthorized access to a protected storage area is rejected;

every test template having variable-length fields generated is tested, a service request having variable-length fields with a test template having larger length fields is rejected, and every buffer overflow is reported; and every test template having a passed control block address is tested, a service request with a test template having a passed control block address that is verified through independent chain verification; and returning an overall failure return code when at least the following combination occurs:

every test template generated is tested, and at least one service request having unauthorized access to a protected storage area is not rejected;

every test template having variable-length fields generated is tested, and at least one service request having variable-length fields with a test template having larger length fields is not rejected, and at least one buffer overflow is not reported; and every test template having a passed control block address is tested, and at least one service request with a test template having a passed control block address that is not verified through independent chain verification.

15. A computer program product comprising a computer readable storage medium having computer executable instructions for testing interfaces of a computer storage of a computer system for storage system vulnerabilities embodied therewith, when executed by a processor of the computer system, the computer executable instructions cause the processor to perform:

generating, by the computer system, a plurality of first test templates, wherein generating the plurality of first test templates includes generating a first test template for each contiguous parameter area of a plurality of parameter area interfaces for a given system service's interface for vulnerabilities regarding storage protection keys by replacing, by the system, each contiguous parameter area of the plurality of parameter area interfaces with unauthorized parameters to generate expected failures;

generating, by the computer system, a plurality of second test templates, wherein the generating of the plurality of second test templates includes generating a second test template for each variable-length parameter area of the plurality of parameter area interfaces having variable-length fields for vulnerabilities regarding buffer overflows in an attempt to access a protected storage area beyond an unprotected storage area with a larger length field to generate expected failures;

generating, by the computer system, a plurality of third test templates, wherein the generating of the plurality of third test templates includes generating a third test template for each control block of a plurality of control blocks to replicate copies and verify the replicated copies through an independently anchored chain that will generate expected failures from the system service's validation;

processing, by the computer system, the plurality of first test templates, the plurality of second test templates, the plurality of third test templates, and the plurality of parameter area interfaces, wherein the processing includes making, by the computer system, copies of the plurality of parameter area interfaces before iteratively replacing each with authorized-key, fetch-protected storage and subsequently replacing each with large variable length values;

after making the copies, executing, by the computer system, one or more tests for each first template of the plurality of first templates, each second template of the plurality of second templates, and each third template of the third plurality of templates; and summarizing, by the computer system, results of the tests executed and returning an overall return code based on summarized results of the tests.

16. The computer program product of claim 15, wherein the storage protection keys comprise at least a plurality of lower level storage protection keys and a plurality of higher level storage protection keys, wherein a service provider running on the computer system is authorized to access a protected storage area corresponding to the plurality of higher level storage protection keys as well as an unprotected storage area corresponding to the plurality of lower level storage protection keys, and a user requesting service is only authorized to access an unprotected storage area corresponding to the plurality of lower level storage protection keys.

17. The computer program product of claim 15, wherein the generating of the first test template comprises at least one of:

defining a test template with unauthorized access to a protected storage area through a base address; and defining a test template with unauthorized access to a protected storage area through an indirect interface.

18. The computer program product of claim 15, wherein the generating of the second test template comprises at least one of:

defining a test template for a parameter area interface having one or more variable-length fields through a base address; and defining a test template for a parameter area interface having one or more variable-length fields through an indirect parameter area interface.

19. The computer program product of claim 15, wherein the generating of the third test template comprises at least one of:

defining a test template with unauthorized access to a protected storage area through a component-owned control block; and defining a test template for a parameter area interface having one or more variable-length fields through a component-owned control block.

20. The computer program product of claim 15, wherein the returning of overall return code comprises:

returning an overall success return code when at least the following combination occurs:

every test template generated is tested, and every service request having unauthorized access to a protected storage area is rejected;

every test template having variable-length fields generated is tested, a service request having variable-length fields with a test template having larger length fields is rejected, and every buffer overflow is reported; and every test template having a passed control block address is tested, a service request with a test template having a passed control block address that is verified through independent chain verification; and returning an overall failure return code when at least the following combination occurs:

every test template generated is tested, and at least one service request having unauthorized access to a protected storage area is not rejected;

every test template having variable-length fields generated is tested, and at least one service request having variable-length fields with a test template having larger length fields is not rejected, and at least one buffer overflow is not reported; and every test template having a passed control block address is tested, and at least one service request with a test template having a passed control block address that is not verified through independent chain verification.

\* \* \* \* \*